United States Patent
Osawa et al.

(10) Patent No.: US 6,576,701 B2
(45) Date of Patent: Jun. 10, 2003

(54) FLUORORUBBER COMPOSITIONS

(75) Inventors: Yasuhisa Osawa, Usui-gun (JP); Shinichi Sato, Usui-gun (JP); Takashi Matsuda, Usui-gun (JP); Makoto Sato, Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 155 days.

(21) Appl. No.: 09/729,774

(22) Filed: Dec. 6, 2000

(65) Prior Publication Data

US 2001/0008914 A1 Jul. 19, 2001

(30) Foreign Application Priority Data

Dec. 6, 1999 (JP) ............................................. 11-346691

(51) Int. Cl.$^7$ ............................ C08L 27/12; C08L 83/14
(52) U.S. Cl. ...................... 524/520; 524/544; 524/588
(58) Field of Search ................................ 524/515, 520, 524/575, 544, 588; 525/199, 200, 276

(56) References Cited

U.S. PATENT DOCUMENTS 6,201,056 B1 * 3/2001 Zhu ............................ 524/493

* cited by examiner

*Primary Examiner*—Robert D. Harlan
(74) *Attorney, Agent, or Firm*—Millen, White, Zelano & Branigan, P.C.

(57) ABSTRACT

A crosslinkable fluororubber composition comprising (A) a perfluoro compound having at least two alkenyl groups and a divalent perfluoroalkylene or perfluoropolyether structure in the backbone or a polymer obtained by adding a compound having at least two hydrosilyl groups in the molecule to some alkenyl groups on the perfluoro compound, (B) a reinforcing filler, (C) a addition reaction crosslinking agent having a hydrosilyl group or a peroxide crosslinking agent, and (D) a surface treating agent having at least one fluoroalkyl or fluoropolyalkyl ether group and silanol groups is improved in heat resistance in the cured state by adding thereto (E) a heat resistance modifier selected from carbon black, metal oxides and metal hydroxides.

20 Claims, No Drawings

FLUORORUBBER COMPOSITIONS

This invention relates to fluororubber compositions which can be readily loaded with fillers and effectively roll milled and cure into products having excellent heat resistance as well as satisfactory solvent resistance, chemical resistance, low-temperature properties and mechanical strength.

BACKGROUND OF THE INVENTION

Prior art vinylidene fluoride base fluororubbers are used in a variety of applications mainly in the automobile and mechanical industries since they produce elastomers having good heat resistance and mechanical strength.

These fluororubbers, however, are not satisfactory in chemical resistance. They are readily swollen in polar solvents such as ketone, lower alcohol, carbonyl and organic acid solvents. They are deteriorated by amine-containing chemicals so that their rubber strength and elongation may substantially decline. With respect to low-temperature properties, the fluororubbers lose rubber elasticity at temperatures below $-20°$ C. to such an extent that they cannot be used as sealants. This generally imposes a limit on the use of fluororubbers in cold areas.

In order to eliminate these drawbacks, curable fluorine-containing compositions comprising a perfluoro compound and a fluorinated organohydrogenpolysiloxane as main components were proposed. These compositions, however, are liquid because they are based on liquid perfluoro compounds having a low degree of polymerization. Then the compositions are suitable in the FIPG process and LIMS molding, but less effective in compression molding conventionally employed for rubber molding.

In particular, the curable fluorine-containing compositions often prohibit the use of conventional two-plate molds for rubber because of the difficulty of molding and the frequent occurrence of defects by air entrainment. Steady production is difficult unless a special LIMS mold is newly fabricated. The LIMS mold, however, has the problems that it is generally more expensive than the conventional two-plate molds for rubber, the mounting of the mold in a LIMS molding machine is cumbersome, and the molding machine requires time-consuming adjustment after mold mounting. The LIMS mold does not lend itself to the manufacture of a variety of parts in small quantities.

Under the circumstances, we previously proposed in U.S. Ser. No. 09/336,716 a method for preparing a rubber composition of the type that can be roll milled and molded in a compression molding rubber mold, referred to as millable type composition, from a fluorinated curable composition comprising a perfluoro compound, a fluorinated organohydropolysiloxane, a filler and a surface treating agent.

This composition has a good profile of properties including roll working, heat resistance, solvent resistance, chemical resistance, low-temperature properties and mechanical strength. However, the composition was found to be still short in the long-term heat resistance at high temperature as required in the application in a hot environment such as a sealant used in proximity to the automobile engine

SUMMARY OF THE INVENTION

Therefore, an object of the invention is to provide a fluororubber composition of the millable type which can be effectively roll milled and cure into products having outstanding heat resistance as well as satisfactory solvent resistance, chemical resistance, low-temperature properties and mechanical strength.

The invention provides a crosslinkable fluororubber composition comprising (A) 100 parts by weight of a perfluoro compound having at least two alkenyl groups in the molecule and a divalent perfluoroalkylene or divalent perfluoropolyether structure in the backbone or a polymer obtained by adding a compound having at least two hydrosilyl groups in the molecule and capable of addition reaction with alkenyl groups to some alkenyl groups on said perfluoro compound, (B) 1 to 100 parts by weight of a reinforcing filler, (C) a sufficient amount to induce reaction of the alkenyl groups in component (A) of a crosslinking agent having a hydrosilyl group in the molecule and capable of addition reaction or a peroxide crosslinking agent, (D) 0.01 to 30 parts by weight of a surface treating agent having at least one fluoroalkyl or fluoropolyalkyl ether group and silanol groups in the molecule, and (E) 0.01 to 10 parts by weight of at least one heat resistance modifier selected from carbon black, metal oxides and metal hydroxides.

We have found that the above formulation achieves a significant improvement in heat resistance over a long term and an improvement in roll milling operation.

DETAILED DESCRIPTION OF THE INVENTION

Component (A)

Component (A) of the crosslinkable fluororubber composition is (I) a perfluoro compound having at least two alkenyl groups in the molecule and a divalent perfluoroalkylene or divalent perfluoropolyether structure in the backbone or a polymer obtained by adding (II) a compound having at least two hydrosilyl groups in the molecule and capable of addition reaction with alkenyl groups to some alkenyl groups on the perfluoro compound (I).

The perfluoro compound as component (I) is technically difficult to synthesize into a high molecular weight polymer as typified by a resin or rubber. The perfluoro compound should have at least two alkenyl groups in the molecule and a divalent perfluoroalkylene or divalent perfluoropolyether structure in the backbone. It is preferably a linear perfluoro compound having a viscosity of about 25 to about 1,000,000 centistokes at 25° C.

The perfluoro compound is typically of the following general formula (1).

$$CH_2=CH-(X)_p-(Rf-Q)_a-Rf-(X)_p-CH=CH_2 \quad (1)$$

Herein, X is independently $-CH_2-$, $-CH_2O-$, $-CH_2OCH_2-$, $-Y-NR^1-SO_2-$ or $-Y-NR^1-CO-$ wherein Y is $-CH_2-$ or $-Si(CH_3)_2-Ph-$,

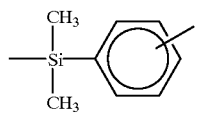

and $R^1$ is hydrogen or a substituted or unsubstituted monovalent hydrocarbon group. Rf is a divalent perfluoroalkylene group or divalent perfluoropolyether group. Letter p is independently equal to 0 or 1, and $a$ is an integer inclusive of 0.

Q is a group of the following general formula (2), (3) or (4).

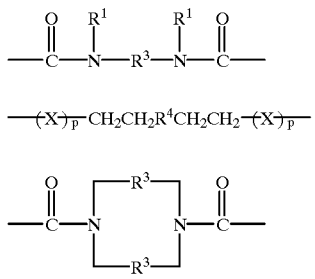

X, p, and $R^1$ are as defined above; $R^3$ is a substituted or unsubstituted divalent hydrocarbon group; and $R^4$ is a substituted or unsubstituted divalent hydrocarbon group which may be separated by at least one intervening atom selected from oxygen, nitrogen, silicon and sulfur atoms, or a group of the following general formula (5) or (6).

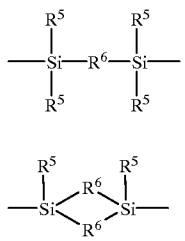

$R^5$ is a substituted or unsubstituted monovalent hydrocarbon group and $R^6$ is a group containing in its backbone structure at least one atom selected from carbon, oxygen, nitrogen, silicon and sulfur atoms.

Specifically, Rf is a divalent perfluoroalkylene group or divalent perfluoropolyether group. The divalent perfluoroalkylene group is preferably represented by the formula: $—C_mF_{2m}—$ wherein m is from 1 to 10, preferably 2 to 6. The divalent perfluoropolyether group is preferably represented by the formula:

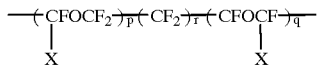

wherein X is F or $CF_3$, p, q and r are integers satisfying $p \geq 1$, $q \geq 1$, $2 \geq p+q \leq 200$, especially $2 \leq p+q \leq 110$, and $0 \leq r \leq 6$,

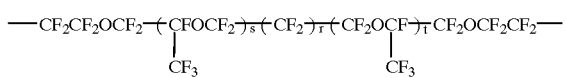

wherein r, s and t are integers satisfying $0 \leq r \leq 6$, $s \geq 0$, $t \geq 0$, $0 \leq s+t \leq 200$, especially $2 \leq s+t \leq 110$,

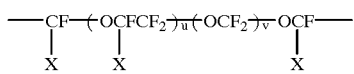

wherein X is F or $CF_3$, u is an integer of 1 to 100 and v is an integer of 1 to 50, or

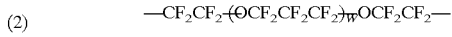

wherein w is an integer of 1 to 100.

Illustrative examples of Rf are given below.

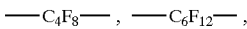

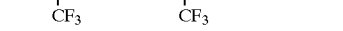

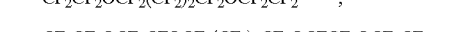

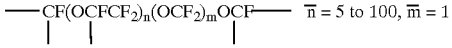

Q is a group of the following general formula (2), (3) or (4).

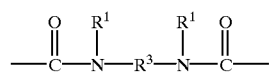

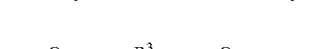

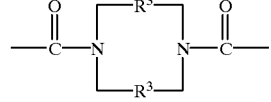

$R^1$ is hydrogen or a substituted or unsubstituted monovalent hydrocarbon group. The substituted or unsubstituted monovalent hydrocarbon groups are preferably those of 1 to 12 carbon atoms, for example, alkyl groups such as methyl, ethyl, propyl, isopropyl, butyl, isobutyl, tert-butyl, pentyl, neopentyl, hexyl, heptyl, octyl, nonyl and decyl; cycloalkyl groups such as cyclopentyl, cyclohexyl, and cycloheptyl; aryl groups such as phenyl, tolyl, xylyl and naphthyl; aralkyl groups such as benzyl, phenylethyl and phenylpropyl; and substituted ones of these groups in which some or all of the hydrogen atoms are replaced by halogen atoms such as fluoro, chloro and bromo, for example, chloromethyl, bromoethyl, chloropropyl, trifluoropropyl, and 3,3,4,4,5,5,6,6,6-nonafluorohexyl.

$R^3$ is a substituted or unsubstituted divalent hydrocarbon group. The substituted or unsubstituted divalent hydrocarbon groups are preferably those of 1 to 10 carbon atoms, more preferably 2 to 6 carbon atoms. Examples include alkylene groups such as methylene, ethylene, propylene, methylethylene, butylene, and hexamethylene; cycloalkylene groups such as cyclohexylene; arylene groups such as phenylene, tolylene, xylylene, naphthylene, and biphenylene; and substituted ones of these groups in which some of the hydrogen atoms are replaced by halogen atoms. It is noted that in formula (4), two $R^3$ groups may be identical or different.

$R^4$ is a substituted or unsubstituted divalent hydrocarbon group which may be separated by at least one intervening atom selected from oxygen, nitrogen, silicon and sulfur atoms. Alternatively, $R^4$ is a group of the following general formula (5) or (6):

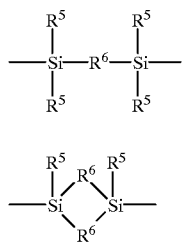

(5)

(6)

wherein $R^5$ is a substituted or unsubstituted monovalent hydrocarbon group and $R^6$ is a group containing in its backbone structure at least one atom selected from carbon, oxygen, nitrogen, silicon and sulfur atoms.

In formulae (5) and (6) representing the groups of $R^4$, the monovalent hydrocarbon groups represented by $R^5$ are the same as the substituted or unsubstituted monovalent hydrocarbon groups described for $R^1$. Exemplary groups represented by $R^6$ are substituted or unsubstituted divalent hydrocarbon groups, preferably of 1 to 20 carbon atoms, more preferably 1 to 10 carbon atoms, for example, alkylene groups such as methylene, ethylene, propylene, methylethylene, butylene, and hexamethylene, cycloalkylene groups such as cyclohexylene, arylene groups such as phenylene, tolylene, xylylene, naphthylene, and biphenylene, substituted ones of these groups in which some of the hydrogen atoms are replaced by halogen atoms, etc., and mixtures of these Substituted or unsubstituted alkylene and arylene groups.

Other examples of the groups represented by $R^6$ are divalent groups containing one or more oxygen, nitrogen, silicon and sulfur atoms in its backbone structure. In the divalent groups, the oxygen atom may intervene in the form of —O—, the sulfur atom may intervene in the form of —S—, and the nitrogen atom may intervene in the form of —NR— wherein R is hydrogen, alkyl of 1 to 8 carbon atoms, preferably 1 to 6 carbon atoms, or aryl. The silicon atom may intervene in the form of an organosiloxane-containing group or organosilylene group. Illustrative examples are given below.

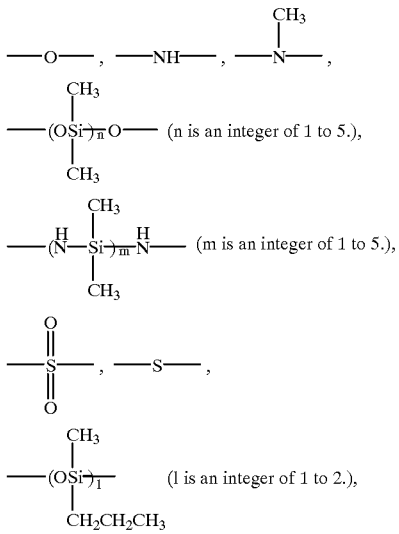

On the other hand, the substituted or unsubstituted divalent hydrocarbon groups represented by $R^4$, which may be separated by at least one atom selected from oxygen, nitrogen, silicon and sulfur atoms, include the substituted or unsubstituted divalent hydrocarbon groups described for $R^6$ and those of the same groups in each of which an oxygen, nitrogen, silicon and/or sulfur atom intervenes midway.

In formula (1), the Q groups represented by formulae (2), (3) and (4) are exemplified by the following groups. Note that in the following formulae, Me is methyl, Ph is phenyl, and R is hydrogen, methyl or phenyl.

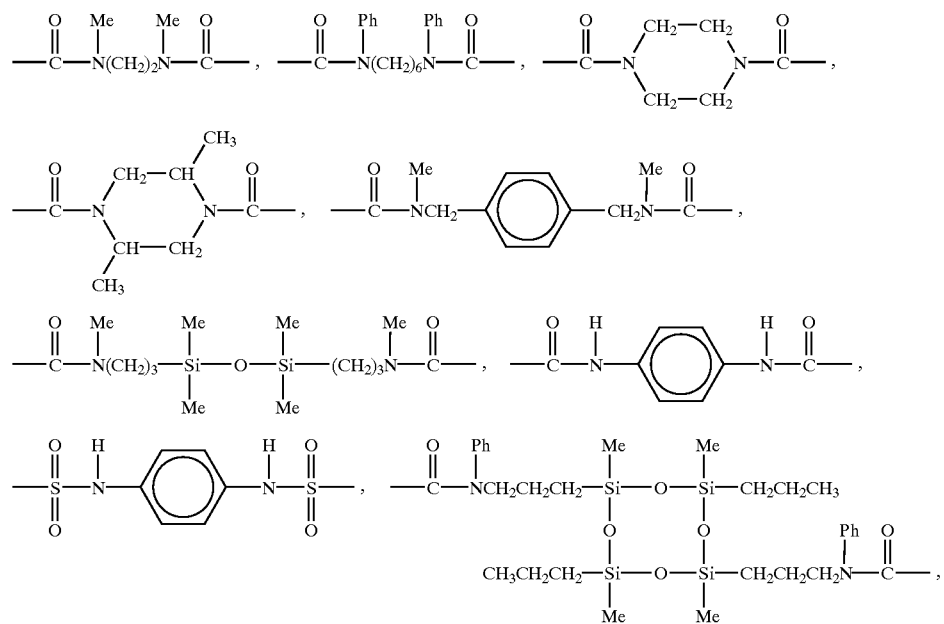

-continued
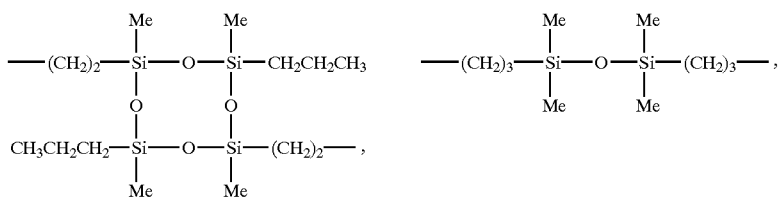
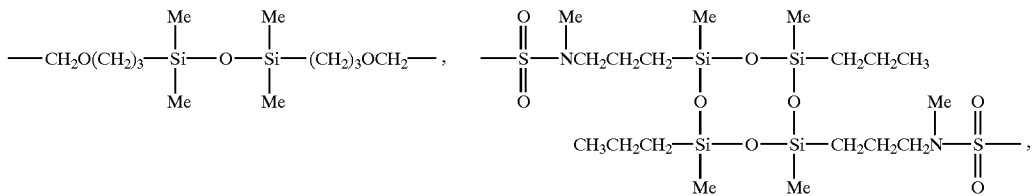
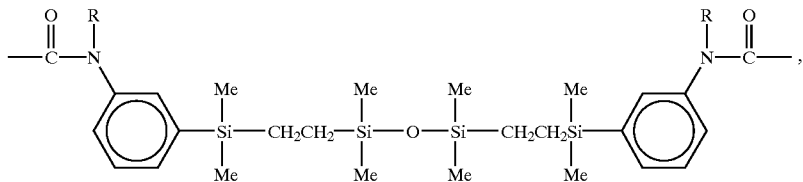
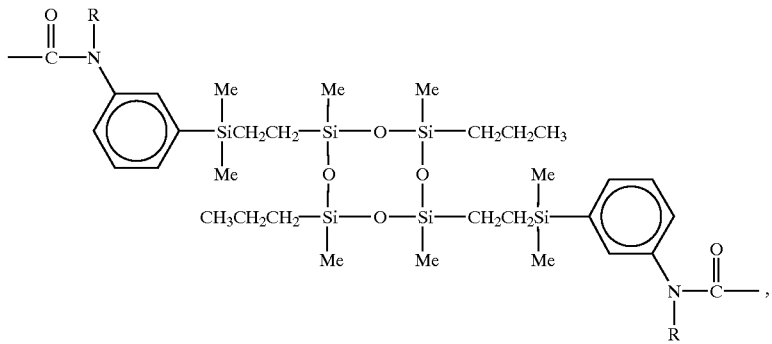
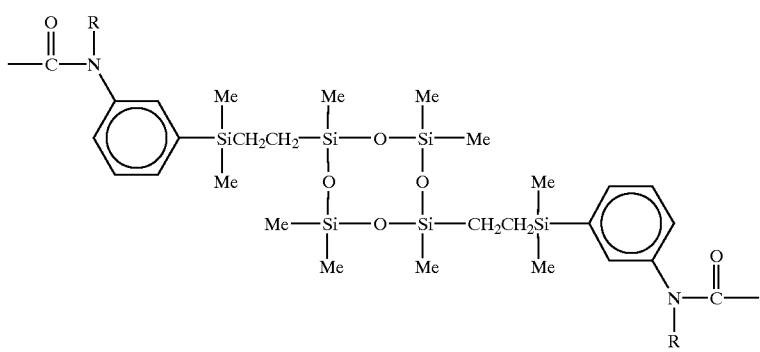

In formula (1), "a" is an integer inclusive of 0. Therefore, the fluorinated compound of formula (1) contains at least one divalent perfluoroalkylene or divalent perfluoropolyether group in one molecule. Preferably, "a" is an integer of 0 to 10, especially 0 to 6.

X is independently selected from among —CH$_2$—, —CH$_2$O—, —CH$_2$OCH$_2$—, —Y—NR$^1$—SO$_2$—, and —Y—NR$^1$—CO— wherein Y is —CH$_2$— or

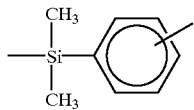

(inclusive of ortho, meta and para-positions), and R$^1$ is hydrogen or a substituted or unsubstituted monovalent hydrocarbon group. It is understood that R$^1$ is as defined previously, and preferably methyl, phenyl or allyl.

Letter p is equal to 0 or 1. The perfluoro compound of formula (1) has a vinyl, allyl or analogous group at either end.

Illustrative examples of the fluoropolyether compound represented by formula (1) are the linear fluoropolyether compounds shown below.

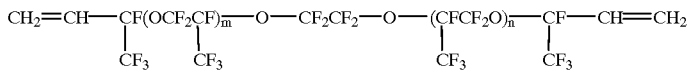

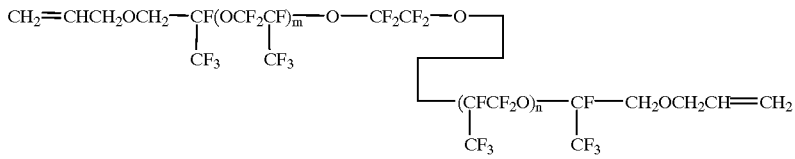

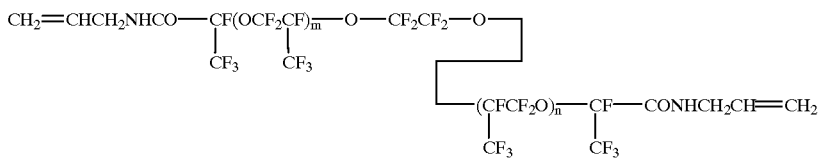

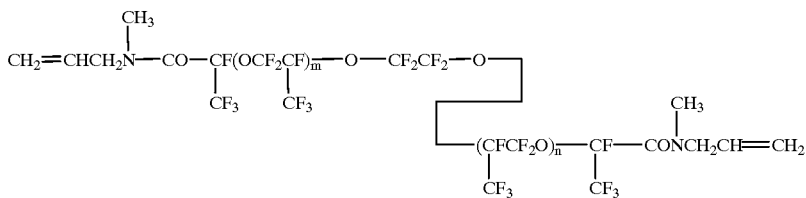

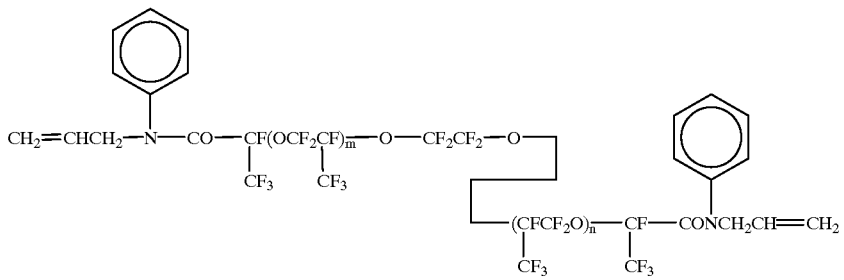

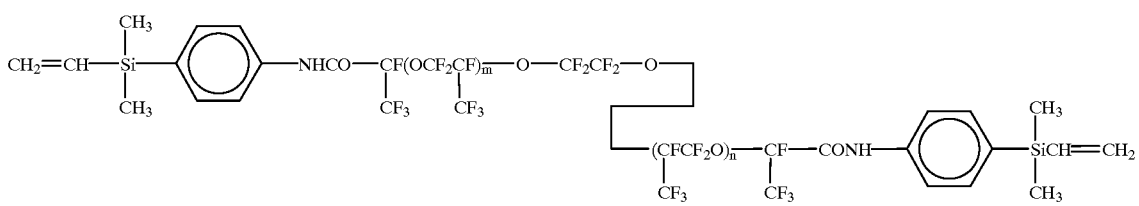

-continued

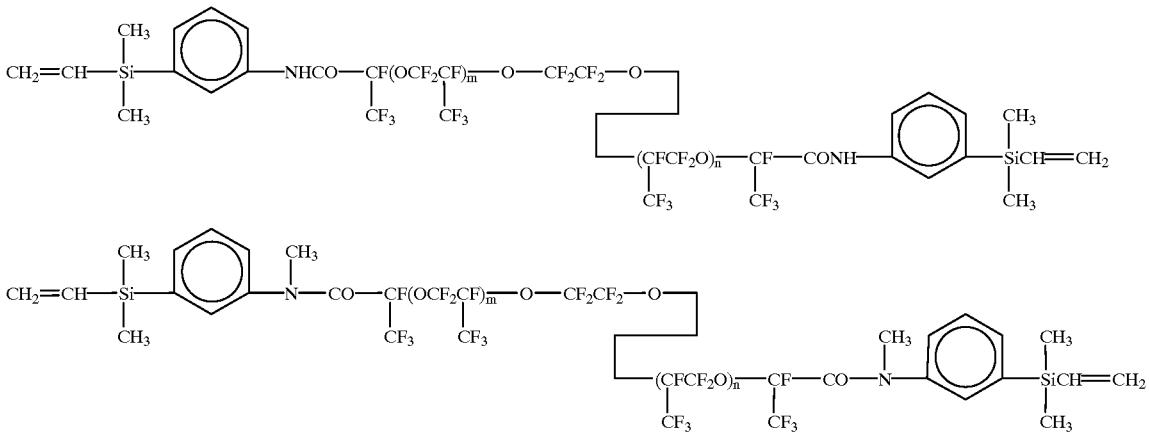

Herein, m and n are integers inclusive of 0, preferably such integers that the compounds may have a viscosity of about 25 to about 1,000,000 centistokes at 25° C.

The linear perfluoro compound as component (I) should preferably have a viscosity of about 25 to about 1,000,000 centistokes at 25° C., more preferably about 100 to about 60,000 centistokes at 25° C. At a viscosity outside the range, there would arise inconvenient problems including difficulty to form a cured rubber product having the desired properties and poor workability.

Next, component (II) is a compound having at least two hydrosilyl groups in the molecule and capable of addition reaction with alkenyl groups. Included are organic compounds containing hydrosilyl groups and organic silicon compounds containing hydrosilyl groups. When dispersibility and heat resistance are taken into account, compounds of the following formulae (7) and (8) are preferred.

$$Z\text{-}CH_2CH_2\text{—}(X)_p\text{-}Rf\text{-}(X)_p\text{—}CH_2CH_2\text{-}Z \quad (7)$$

$$Rf\text{-}(X)_p\text{—}CH_2CH_2\text{-}Z \quad (8)$$

In the formulae (7) and (8), X, p, and Rf are as defined above. Z is a group of the following general formula (9):

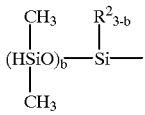
(9)

wherein $R^2$ is a substituted or unsubstituted monovalent hydrocarbon group and b is equal to 1, 2 or 3 for the compound of formula (7) and equal to 2 or 3 for the compound of formula (8).

Specifically, X is independently selected from among —$CH_2$—, —$CH_2O$—, —$CH_2OCH_2$—, —Y—$NR^1$—$SO_2$—, and —Y—$NR^1$—CO—wherein Y is —$CH_2$— or —$Si(CH_3)_2$—Ph—,

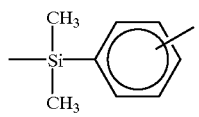

and $R^1$ is hydrogen or a substituted or unsubstituted monovalent hydrocarbon group; Rf is a divalent perfluoroalkylene or divalent perfluoropolyether group; and p is independently equal to 0 or 1.

Illustrative examples of X, Rf and p are as described above. Rf, X and p in formula (7) or (8) may be identical with or different from Rf, X and p in formula (1), respectively.

Z is a group of formula (9).

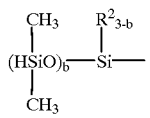
(9)

Herein, $R^2$ is a substituted or unsubstituted monovalent hydrocarbon group. The substituted or unsubstituted monovalent hydrocarbon groups are preferably those of 1 to 8 carbon atoms, for example, alkyl groups such as methyl, ethyl, propyl, isopropyl, butyl, isobutyl, tert-butyl, pentyl, neopentyl, hexyl, heptyl, and octyl; cycloalkyl groups such as cyclopentyl, cyclohexyl, and cycloheptyl; aryl groups such as phenyl, tolyl, and xylyl; aralkyl groups such as benzyl and phenylethyl; and substituted ones of these groups in which some or all of the hydrogen atoms are replaced by halogen atoms such as fluoro, chloro and bromo or the like, for example, chloromethyl, bromoethyl, chloropropyl, trifluoropropyl, and 3,3,4,4,5,5,6,6,6-nonafluorohexyl.

Letter b is equal to 1, 2 or 3 for the compound of formula (7) and equal to 2 or 3 for the compound of formula (8).

Component (A) may be component (I) alone or a non-flowing gel-like polymer which is obtained by effecting addition reaction of hydrosilyl groups in component (II) to some of the alkenyl groups in component (I), the remaining alkenyl groups in component (I) being left in the polymer. Use of the polymer rather than component (I) alone ensures more efficient roll milling.

For the polymer, components (I) and (II) are preferably used in such amounts that the molar ratio of hydrosilyl groups in component (II) to alkenyl groups in component (I) may range from 0.1/1 to 0.99/1, especially from 0.3/1 to 0.8/1. With a ratio of less than 0.1, the perfluoro compound would not be gelled, but somewhat thickened so that even after addition of a filler, the resulting compound may be a liquid rubber which is difficult to sheet by means of a two-roll rubber mill. With a ratio in excess of 0.99, the resulting polymer would become cured rubber to which a filler is added with difficulty or which cannot be wrapped around rolls.

For the addition reaction of component (II) to component (I), it is recommended to use an addition reaction catalyst. Preferred catalysts are platinum group metal compounds. The platinum group metal compounds used herein are generally compounds of noble metals which are expensive. For ease of availability, platinum compounds are often employed. Examples of the platinum compounds include chloroplatinic acid, complexes of chloroplatinic acid with olefins (e.g., ethylene), complexes of chloroplatinic acid with alcohols or vinylsiloxanes, and platinum on silica, alumina or carbon, though not limited thereto. Known as platinum group metal compounds other than the platinum compounds are compounds of rhodium, ruthenium, iridium and palladium, for example, $RhCl(PPh_3)_3$, $RhCl(CO)(PPh_3)_2$, $RhCl(C_2H_4)_2$, $Ru_3(CO)_{12}$, $IrCl(CO)(PPh_3)_2$, and $Pd(PPh_3)_4$.

The amount of the catalyst used is not critical and the desirable curing rate will be achieved with a catalytic amount. From the economical aspect or in order to obtain favorable cured products, an appropriate amount of the catalyst is about 0.1 to about 1,000 ppm, more preferably about 0.1 to about 500 ppm of platinum group metal based on the weight of components (I) and (II) combined.

The conditions for the addition reaction may be determined as appropriate. Reaction may be carried out at room temperature although it is accelerated by heating at about 50 to 200° C.

Component (B)

Component (B) of the fluororubber composition according to the invention is a reinforcing filler. The reinforcing filler is generally added for the purposes of improving roll workability, mechanical strength, thermal stability, weather resistance, chemical resistance and flame retardance, reducing thermal shrinkage upon curing, and/or reducing the coefficient of thermal expansion and gas permeability of an elastomer as cured. The filler is mainly added for the purpose of improving roll workability and mechanical strength in order to provide a rubber composition of the millable type.

The fillers include fumed silica, colloidal silica, diatomaceous earth, quartz flour, glass fibers, and carbon as well as metal oxides such as iron oxide, titanium oxide and cerium oxide and metal carbonates such as calcium carbonate and magnesium carbonate. The fillers may have been treated with various surface treating agents. Among others, fumed silica is preferred for mechanical strength. Fumed silica treated with a surface treating agent in the form of a compound containing silicon in a molecule such as a silane is especially preferred because it is readily dispersible.

The amount of the reinforcing filler blended is 1 to 100 parts by weight per 100 parts by weight of the polymer. Less than 1 part of the filler is insufficient to provide reinforcement and improve roll workability whereas more than 100 parts of the filler detracts from rubber flexibility and prevents the rubber from being wrapped on rolls.

Component (C)

Component (C) is a crosslinking agent which is (C-1) a crosslinking agent having a hydrosilyl group in a molecule and capable of addition reaction or (C-2) a peroxide crosslinking agent.

The crosslinking agent (C-1) is typically a organohydrogenpolysiloxane having at least two, preferably at least three, hydrosilyl groups in a molecule. Such organohydrogenpolysiloxanes may be those commonly used in silicone rubber compositions of the addition reaction curing type. In particular, those siloxanes described above as component (II) can be used.

The amount of crosslinking agent (C-1) added is sufficient to react with residual alkenyl groups in component (A) for thereby curing component (A). From the standpoint of the shelf stability of rubber compositions, like prior art millable rubber compositions, the crosslinking agent is desirably added to the polymer composition immediately before rubber molding. It is important for stabilizing rubber physical properties to determine the amount of the crosslinking agent added by taking into account the type and amount of the crosslinking compound used as component (II) in component (A). Specifically, the crosslinking agent is preferably added in such an amount that the ratio of {hydrosilyl groups in component (II) plus hydrosilyl groups in component (C)}/{alkenyl groups in component (I)} may range from 0.5 to 5, especially from 0.8 to 2.

In crosslinking agent (C-1), an addition reaction catalyst such as a platinum group metal compound may be blended if desired. If the addition reaction catalyst used in the preparation of component (A) is left in component (A), the catalyst need not necessarily be added. The catalyst, if added, is used in a catalytic amount which is as described above.

The other component (C-2) is a peroxide crosslinking agent. Examples of this crosslinking agent include dibenzoyl peroxide, dicumyl peroxide, di-t-butyl peroxide, t-butylperoxyacetate, t-butylperoxybenzoate, and 2,5-dimethyl-2,5-di-t-butylperoxyhexane, with the 2,5-dimethyl-2,5-di-t-butylperoxyhexane being preferred from the standpoints of shelf stability and scorch prevention.

The peroxide crosslinking agent is added in a sufficient amount to cure component (A), preferably 0.1 to 5 parts by weight, more preferably 0.5 to 3 parts by weight per 100 parts by weight of component(A). Less than 0.1 part of the peroxide crosslinking agent would induce insufficient or slow crosslinking whereas more than 5 parts would adversely affect the physical properties of rubber.

Component (D)

Component (D) is a surface treating agent in the form of a compound having at least one fluoroalkyl group or fluoropolyalkyl ether group and silanol groups in the molecule. The fluoroalkyl group is preferably selected from alkyl groups of 1 to 20 carbon atoms, especially 1 to 10 carbon atoms, in which some or all of the hydrogen atoms on the alkyl group are replaced by fluorine atoms, and the compound is preferably selected from silanes and siloxanes of 1 to 20 silicon atoms, more preferably 1 to 5 silicon atoms. This surface treating agent is essential for improving the wettability between the filler and the polymer for facilitating the blending and dispersion of the filler and hence, compounding operation so that the resulting composition is improved in mechanical strength. Accordingly, it must bear in its molecule silanol groups having affinity to surfaces of the filler such as fumed silica and at least one fluoroalkyl or fluoropolyalkyl ether group affinity to the perfluoro backbone of the polymer.

The surface treating agent having at least one fluoroalkyl group and silanol groups in the molecule is exemplified by compounds of the following formulas. They may be used alone or in admixture of two or more.

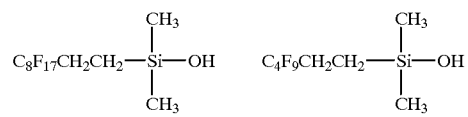

-continued

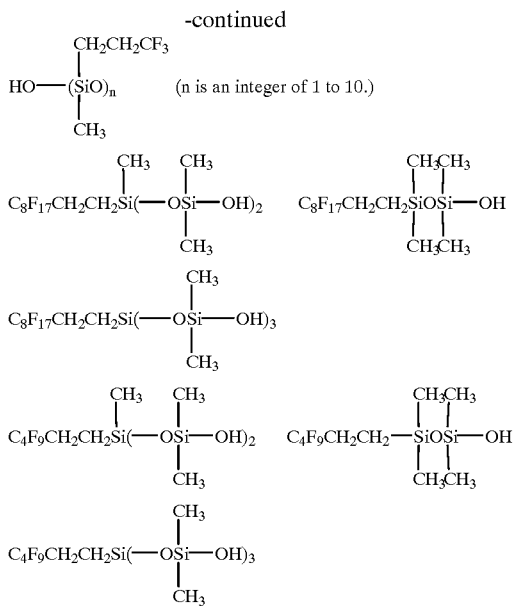

(n is an integer of 1 to 10.)

An appropriate amount of the surface treating agent blended is 0.01 to 30 parts by weight per 100 parts by weight of the polymer (A). Less than 0.01 part of the agent achieves ineffective surface treatment so that little improvements in filler/rubber blending (or working) and rubber physical properties are expectable. More than 30 parts of the agent facilitates filler/rubber blending (or working), but gives rise to the problem that an excess of the agent becomes an impurity causing to detract from rubber physical properties. The preferred amount is 0.1 to 20 parts by weight.

Component (E)

Component (E) is a heat resistance modifier which is most important in the present invention and selected from carbon black, metal oxides, and metal hydroxides. It is believed that the modifier serves to improve heat resistance by absorbing or neutralizing radicals and acidic substances such as hydrogen fluoride generated at high temperature.

The modifier (E) is generally available in powder form. As opposed to the reinforcing filler (B), the modifier is not added for the purpose of improving mechanical strength, but for the purpose of absorbing or neutralizing radicals and acidic substances generated at high temperature. If the modifier (E) is surface treated, its surface activity is lost so that its addition effect becomes low. It is thus undesired to surface treat the modifier (E) or add the modifier (E) simultaneously with the surface treating agent (D).

Examples of useful carbon black include lamp black, various furnace black species and acetylene black. Of these, acetylene black is preferred since it eliminates any potential influence on crosslinking properties and rubber properties by impurities.

The metal oxides include iron oxide, calcium oxide, magnesium oxide, zinc oxide, lead oxide, copper oxide, titanium oxide, aluminum oxide, cadmium oxide, cobalt oxide and cerium oxide. Of these, magnesium oxide, iron oxide and cerium oxide are preferred since they are easy to compound in rubber and remain stable in the compound.

Useful metal hydroxides include potassium hydroxide, calcium hydroxide, magnesium hydroxide, zinc hydroxide, and aluminum hydroxide. Of these, calcium hydroxide is more stable and safe to handle.

The addition of the modifier alone is effective for improving heat resistance although the addition of two or more modifiers achieves a greater improvement.

Whether the modifier (E) is added alone or in admixture of two or more, an appropriate amount of the modifier is 0.01 to 10 parts by weight per 100 parts by weight of component (A). Less than 0.01 part achieves little improvement in heat resistance. More than 10 parts of the modifier may adversely affect the mechanical strength of the rubber because it lacks reinforcement effect unlike fumed silica. More preferably the modifier is used in an amount of 0.1 to 5 parts by weight so that the resulting fluororubber composition may possess both mechanical strength and heat resistance.

In the composition, various additives may be added for the purpose of enhancing its practical utility, if necessary. Such additives include, for example, polysiloxanes containing $CH_2=CH(R)SiO$ units wherein R is hydrogen or a substituted or unsubstituted monovalent hydrocarbon group (see JP-B 48-10947) and acetylene compounds (see U.S. Pat. No. 3,445,420 and JP-B 54-3774), both added for controlling the curing rate of the composition, and ionic compounds of heavy metals (see U.S. Pat. No. 3,532,649).

The fluororubber composition of the invention is prepared by a method including the steps of:
  (a) forming a polymer as component (A),
  (b) adding a filler as component (B) and a surface treating agent as component (D), then
  (c) adding a heat resistance modifier as component (E), and
  (d) adding a crosslinking agent as component (C).

Step (a) is omitted where the perfluoro compound is used alone. Where a polymer of the perfluoro compound is to be used, step (a) is to increase the molecular weight of a liquid perfluoro compound, which is otherwise difficult to increase its molecular weight to a roll workable level, by crosslinking some of the reactive groups thereon with hydrosilyl groups. Step (a) is thus referred to as precure step. This step enables subsequent blending of a filler on a twin-roll rubber mill. If the molecular weight is not increased by this step, there results a liquid or paste composition similar to prior art liquid rubbers, which is difficult to blend or sheet on a roll rubber mill.

Since step (a) is mixing of liquids, a beaker level of agitation is acceptable and relatively simple mixing machines may be used. Satisfactory mixing can be carried out with commercially available liquid mixing machines. Mixing in a rubber blending apparatus to be used in the subsequent step of filler blending is convenient because there is no need to transfer the composition. It is thus recommended to carry out mixing in rubber kneading machines such as rubber kneaders, pressure kneaders and Banbury mixers to be used in blending step (b). The precure step may be at room temperature although heating may be employed for accelerating addition reaction. Heating at 50 to 200° C. for about 10 minutes to 24 hours is sufficient for such purposes.

Step (b) is to add a filler as component (B) for adjusting hardness, rubber strength and roll workability and a surface treating agent as component (D) for facilitating blending of the filler and improving rubber physical properties. The composition resulting from step (b) takes the same form as prior art millable type rubber compositions. Especially, by virtue of component (D) blended, the composition becomes shelf stable and roll workable.

As mentioned above, step (b) may use rubber kneaders, pressure kneaders and Banbury mixers as commonly used in blending of conventional rubbers.

This blending may be carried out at room temperature. If appropriate for the purpose of stabilizing shearing heat, heating may be done within the temperature range not causing decomposition of the polymer. Heating at about 100 to 300° C. for about 10 minutes to about 8 hours is desirable.

In step (c), the heat resistance modifier is added. In order that the modifier be uniformly dispersed, step (c) is intermediate step (b) of blending the filler and step (d) of blending the crosslinking agent. The modifier may be added either immediately after step (b) and in the kneading machine used in step (b) or immediately before step (d) and in an apparatus used in step (d).

Step (d) is to blend a crosslinking agent as component (C) and optionally, a catalyst, crosslinking aid and other additives. As the apparatus used in step (d), rubber kneaders, pressure kneaders and Banbury mixers are undesirable because of the risk of a scorching phenomenon that the heat generated by mixing drives crosslinking. Desirable are twin-roll rubber mills also capable of sheeting operation, especially equipped with cooling means for suppressing crosslinking from being driven by the heat generating during milling.

In curing the composition of the invention, preferred conditions for primary curing include a temperature of about 100 to 200° C. and a time of about 1 to 30 minutes. Temperatures below 100° C. take a longer curing time, which is undesirable for commercial production. Temperatures above 200° C. have the risk of scorching. The preferred temperature is in the range of about 100 to 200° C. and more preferably about 120 to 170° C. The curing time at such temperatures may be selected as appropriate to ensure that the crosslinking reaction is completed. In order to stabilize the physical properties of the inventive composition, secondary curing is preferably carried out by heating at a temperature of about 100 to 230° C. for a time of about 1 to 24 hours. Secondary curing at temperatures below 100° C. is ineffective whereas temperatures above 230° C. can cause pyrolysis. More preferably, secondary curing is carried out at about 150 to 200° C. for about 1 to 20 hours.

EXAMPLE

Examples of the invention are given below by way of illustration and not by way of limitation. In Examples, all parts are by weight and the viscosity is as measured at 25° C.

The materials used in Examples are as shown below.

Polymer (Perfluoro Compound):

viscosity 4,400 cSt average molecular weight 16,500 vinyl content 0.013 mol/100 g

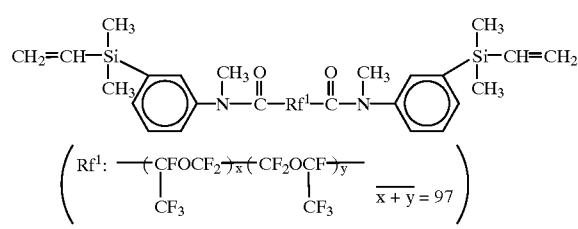

Precure Agent (Addition Reaction Crosslinker):

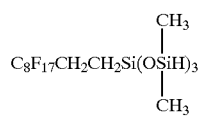

Surface Treating Agent:

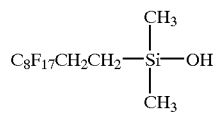

Addition Reaction Crosslinker:

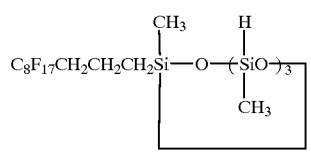

Addition Reaction Catalyst:
PL50T (platinum compound catalyst by Shin-Etsu Chemical Co., Ltd.)
Reinforcing Filler:
R976 (fumed silica treated with silicon-base surface treating agent by Nippon Aerosil K. K.)
Reaction Regulator:
ethynyl cyclohexanol, 50% toluene solution
Carbon Black:
Denka Black, Denki Kagaku Kogyo K. K., acetylene black
Cerium Oxide:
Reagent grade, Wako Junyaku K. K.
Magnesium Oxide:
Kyo-Mag #150, Kyowa Chemical K. K.
Iron Oxide:
Toda Color 130ED, Toda Chemical K. K.
Calcium Hydroxide:
Caldic #2000, Ohmi Chemical K. K.

Examples 1–7 and Comparative Example 1

Fluororubber compositions were obtained by mixing ingredients as shown in Table 1 according to the following steps.

Step (a): Precure

A 1-liter beaker was charged with the polymer and the precure agent in a blending ratio as shown in Table 1. The contents were manually mixed for 10 minutes at room temperature using an agitating rod, the catalyst was then added, and mixing was continued for a further 15 minutes. This mixture was allowed to stand for 3 hours at room temperature, during which period the polymer gradually increased its viscosity and eventually became a gum-like polymer.

Step (b): Filler and Surface Treating Agent Blending

The polymer was transferred to a 300-cc laboratory kneader where the temperature was raised to 170° C. and the filler and the surface treating agent were added in amounts as shown in Table 1.

After the filler addition, kneading was continued for one hour at the same temperature, obtaining a base compound.

Step (c): Heat Resistance Modifier Blending

The compound of step (b) was taken out of the kneader and wrapped around a twin-roll rubber mill where the heat resistance modifier was blended was shown in Table 1, yielding a final compound.

Step (d): Crosslinker Blending

On the twin-roll rubber mill, the addition reaction regulator and the addition reaction crosslinker were blended with the compound, yielding a curable fluororubber composition.

TABLE 1

| Step | Ingredients | Blending amount (pbw) |
| --- | --- | --- |
| (a) precured rubber preparation | Polymer | 100 |
| | Precure crosslinker | 1.8 |
| | Catalyst | 0.2 |
| (b) Filler and surface treating agent blending | Reinforcing filler | 35 |
| | Surface treating agent | 6 |
| (c) Modifier blending | Heat resistance modifier | appropriate (Examples) |
| (d) Crosslinker blending | Crosslinker | 1.3 |
| | Regulator | 0.2 |

The properties of the resulting fluororubber compositions were measured by the following tests. The results are shown in Table 2.

Physical Properties

A curable rubber composition was molded in a 75-ton rubber press mold at 150° C. for 10 minutes to form a rubber sheet of 2 mm thick, which was post cured at 200° C. for 4 hours. The sheet was measured for physical properties (hardness, elongation and tensile strength) by the JIS rubber rating method.

Heat Resistance

The rubber sheet prepared above was allowed to stand in a dryer at, 200° C. for 500 hours before it was similarly measured for physical properties (hardness, elongation and tensile strength). A change of tensile strength was used as the predominant factor of evaluating heat resistance.

TABLE 2

| | Heat resistance modifier (pbw) | | Hardness (JIS-A) | Elongation (%) | Tensile strength (kg/cm$^2$) |
| --- | --- | --- | --- | --- | --- |
| CE1 | none | Initial | 72 | 252 | 103 |
| | | After heating | 80 | 117 | 60 |
| | | Change | +8 points | −54% | −42% |
| Example 1 | Carbon black (1) | Initial | 72 | 276 | 105 |
| | | After heating | 80 | 169 | 72 |
| | | Change | +8 points | −39% | −31% |
| Example 2 | Cerium oxide (1) | Initial | 70 | 300 | 108 |
| | | After heating | 75 | 213 | 74 |
| | | Change | +5 points | −29% | −31% |
| Example 3 | Magnesium oxide (1) | Initial | 71 | 293 | 103 |
| | | After heating | 77 | 197 | 80 |
| | | Change | +6 points | −33% | −22% |
| Example 4 | Iron oxide (1) | Initial | 70 | 293 | 106 |
| | | After heating | 75 | 160 | 65 |
| | | Change | +5 points | −41% | −38% |
| Example 5 | Calcium hydroxide (1) | Initial | 71 | 299 | 103 |
| | | After heating | 76 | 179 | 71 |
| | | Change | +5 points | −40% | −31% |
| Example 6 | Carbon black (0.5) + cerium oxide (1) | Initial | 72 | 285 | 108 |
| | | After heating | 78 | 224 | 98 |
| | | Change | +6 points | −21% | −10% |

TABLE 2-continued

| | Heat resistance modifier (pbw) | | Hardness (JIS-A) | Elongation (%) | Tensile strength (kg/cm$^2$) |
| --- | --- | --- | --- | --- | --- |
| Example 7 | Carbon black (0.5) + iron oxide (1) | Initial | 71 | 280 | 117 |
| | | After heating | 77 | 188 | 81 |
| | | Change | +6 points | −33% | −30% |

A comparison of the physical properties of the heat resistance modifier-containing compositions in Table 2 with those of the modifier-free composition (Comparative Example 1) reveals minimized losses of tensile strength. Outstanding effects result from with the combination of carbon black and cerium oxide in Example 6.

The fluororubber composition of the invention cures into rubber having significantly improved heat resistance.

Japanese Patent Application No. 11-346691 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A crosslinkable fluororubber composition comprising (A) 100 parts by weight of a perfluoro compound having at least two alkenyl groups in the molecule and a divalent perfluoroalkylene or divalent perfluoropolyether structure in the backbone or a polymer obtained by adding a compound having at least two hydrosilyl groups in the molecule and capable of addition reaction with alkenyl groups to some alkenyl groups on said perfluoro compound, (B) 1 to 100 parts by weight of a reinforcing filler, (C) a sufficient amount to induce reaction of the alkenyl groups in component (A) of a crosslinking agent having a hydrosilyl group in the molecule and capable of addition reaction or a peroxide crosslinking agent, (D) 0.01 to 30 parts by weight of a surface treating agent having at least one fluoroalkyl or fluoropolyalkyl ether group and silanol groups in the molecule, and (E) 0.01 to 10 parts by weight of at least one heat resistance modifier selected from the group consisting of carbon black, metal oxides and metal hydroxides.

2. The composition of claim 1 wherein the perfluoro compound in component (A) is of formula (1):

$$CH_2=CH(X)_p\text{-}(Rf\text{-}Q)_a\text{-}Rf\text{-}(X)_p\text{-}CH=CH_2 \quad (1)$$

wherein X is independently —CH$_2$—, —CH$_2$O—, —CH$_2$OCH$_2$—, —Y—NR$^1$—SO$_2$— or —Y—NR$^1$—CO—, wherein Y is —CH$_2$—, or

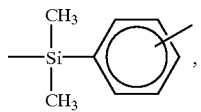

R$^1$ is hydrogen or a substituted or unsubstituted monovalent hydrocarbon group, Rf is a divalent perfluoroalkylene or divalent perfluoropolyether group, p is independently equal to 0 or 1, a is an integer inclusive of 0, and Q is a group of formula (2), (3) or (4):

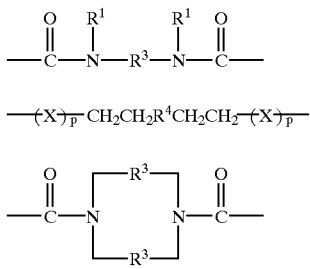

(2)

(3)

(4)

wherein X, p, and $R^1$ are as defined above, $R^3$ is, each independently, a substituted or unsubstituted divalent hydrocarbon group, and $R^4$ is a substituted or unsubstituted divalent hydrocarbon group which is optionally separated by at least one intervening atom selected from the group consisting of oxygen, nitrogen, silicon and sulfur atoms, or a group of formula (5) or (6):

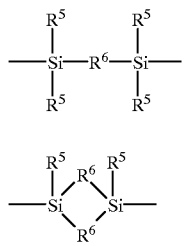

(5)

(6)

wherein $R^5$ is a substituted or unsubstituted monovalent hydrocarbon group and $R^6$ is a group containing in its backbone structure at least one atom selected from the group consisting of carbon, oxygen, nitrogen, silicon and sulfur atoms.

3. The composition of claim 1 wherein the hydrosilyl-bearing compound in component (A) is of formula (7) or (8):

$Z\text{-}CH_2CH_2\text{—}(X)_p\text{-}Rf\text{-}(X)_p\text{—}CH_2CH_2\text{-}Z$  (7)

$Rf\text{-}(X)_p\text{—}CH_2CH_2\text{-}Z$  (8)

wherein X is independently —$CH_2$—, —$CH_2O$—, —$CH_2OCH_2$—, —Y-$NR^1$—$SO_2$— or —Y-$NR^1$—CO—, wherein Y is —$CH_2$—, or

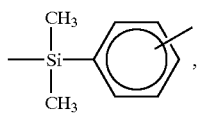

Rf is a divalent perfluoroalkylene or divalent perfluoropolyether group, p is independently equal to 0 or 1, and Z is a group of the following general formula (9):

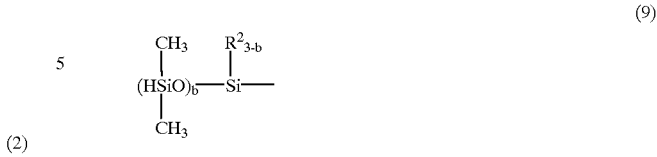

(9)

wherein $R^2$ is a substituted or unsubstituted monovalent hydrocarbon group and b is equal to 1, 2 or 3 for the compound of formula (7) and equal to 2 or 3 for the compound of formula (8).

4. The composition of claim 1 wherein the reinforcing filler (B) comprises fumed silica or fumed silica treated with a surface treating agent containing silicon in the molecule.

5. The composition of claim 1 wherein the surface treating agent (D) is selected from the group consisting of compounds of the following formulas:

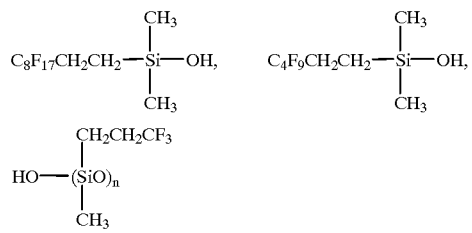

wherein n is an integer of 1 to 10,

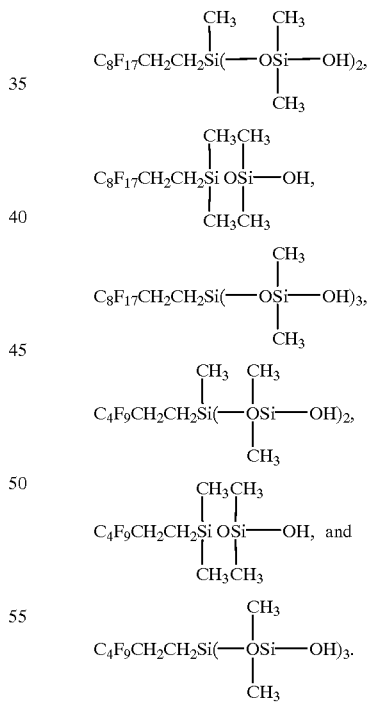

6. The composition of claim 1 wherein component (E) is at least one compound selected from the group consisting of acetylene black, cerium oxide, iron oxide, magnesium oxide and calcium hydroxide.

7. A composition according to claim 2, wherein Rf is a compound of —$C_mF_{2m}$— wherein m is from 1 to 10.

8. A composition according to claim 2, wherein Rf is a compound of formula:

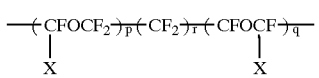

wherein X is F or CF$_3$, p, q and r are integers satisfying p≧1, q≧1, 2≦p+q≦200, and 0≦r≦6,

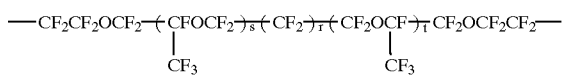

wherein r, s and t are integers satisfying 0≦r≦6, s≧0, t≧0, 0≦s+t≦200,

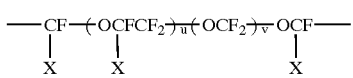

wherein X is F or CF$_3$, u is an integer of 1 to 100 and v is an integer of 1 to 50, or

wherein w is an integer of 1 to 100.

9. A composition according to claim 2, wherein Rf is a compound of a formula selected from the compounds consisting of:

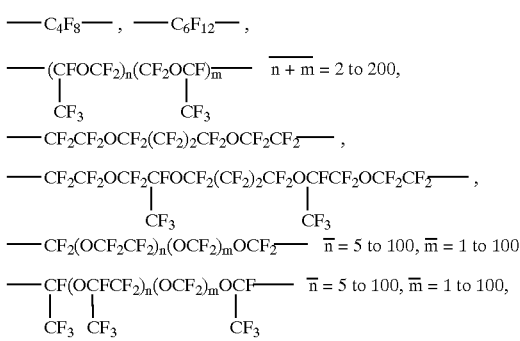

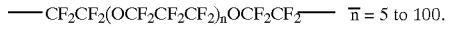

10. A composition according to claim 2, wherein R$_6$ is a compound selected from the compounds consisting of

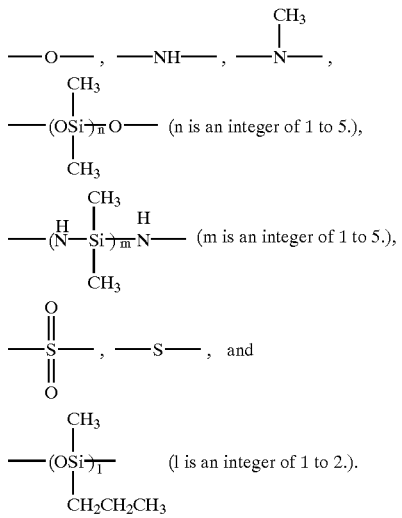

11. A composition according to claim 2, wherein R$^1$ and R$^5$ are, each independently, a hydrocarbon group of 1 to 12 carbon atoms selected from the group consisting of alkyl, cycloalkyl, aryl, and aralkyl, which are optionally substituted with one or more halogen atoms, R$^3$ is a divalent hydrocarbon group of 1 to 10 carbon atoms selected from the group consisting of alkylene, cycloalkylene, and arylene, which are optionally substituted with one or more halogen atoms, and R$^6$ is a divalent hydrocarbon group of 1 to 20 carbon atoms selected from the group consisting of alkylene, cycloalkylene, arylene, and combinations thereof, which are optionally substituted with one or more halogen atoms.

12. A composition according to claim 2, wherein the compound of formula (1) is a compound selected from the group consisting of

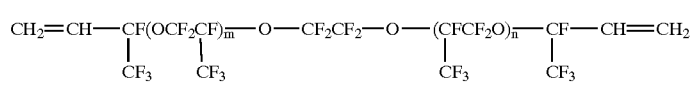

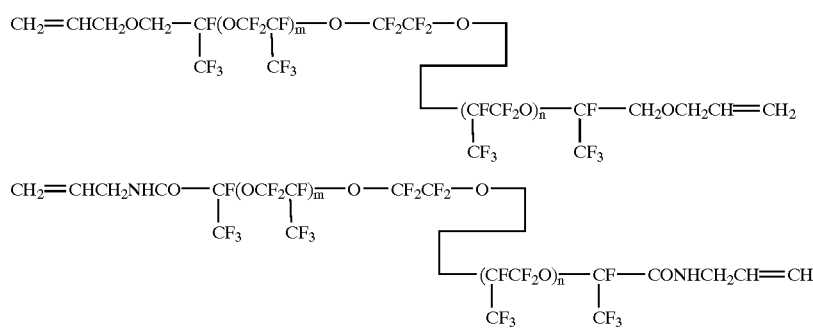

-continued

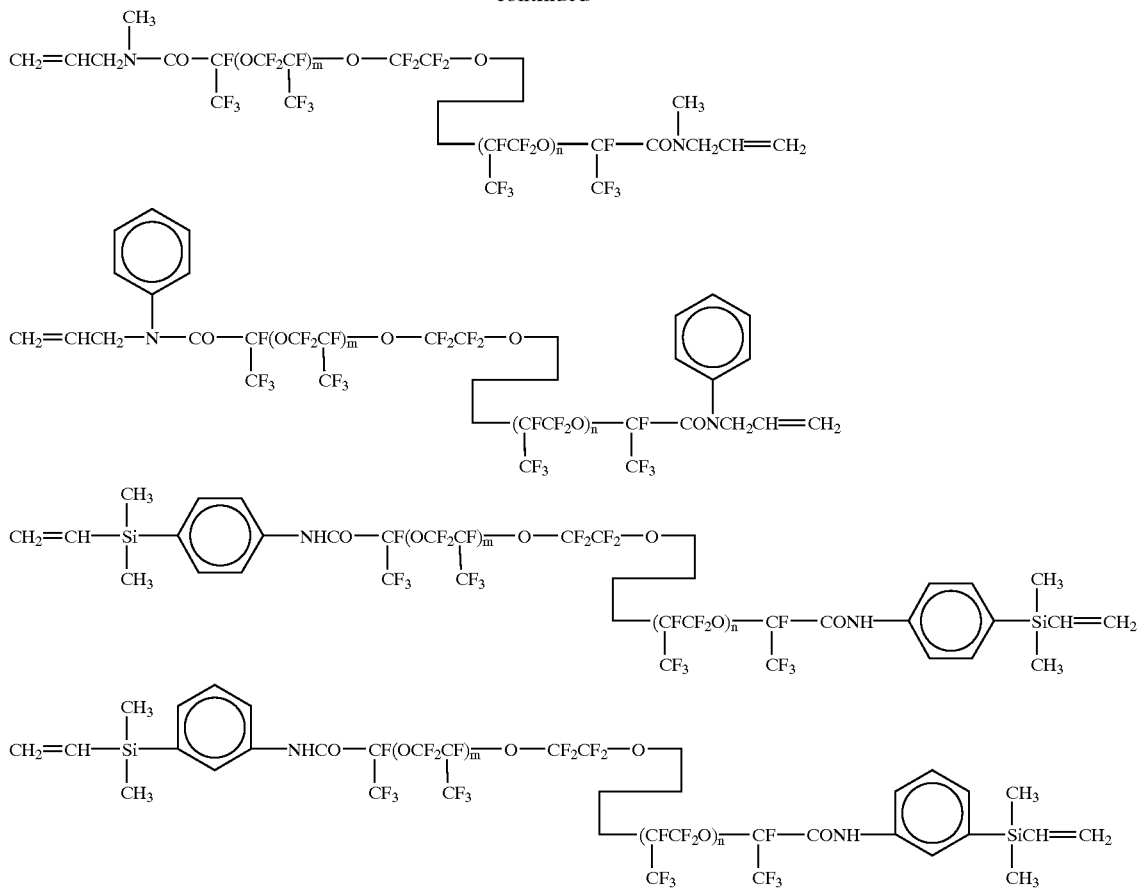

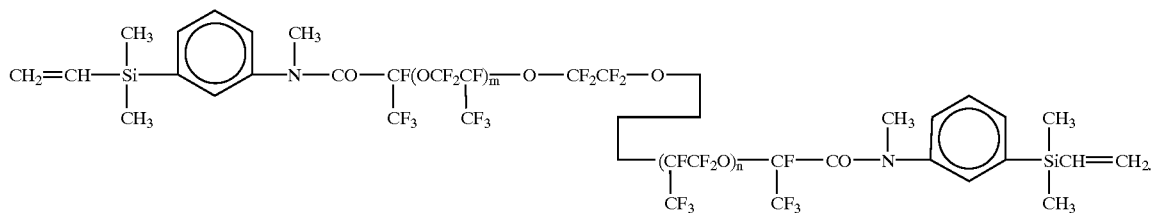

and

13. A composition according to claim 2, wherein a is an integer of 1 to 10.

14. A composition according to claim 2, wherein $R^1$ is methyl, phenyl or allyl.

15. A composition according to claim 3, wherein $R^2$ is a hydrocarbon group of 1 to 8 carbon atoms selected from the group consisting of alkyl, cycloalkyl, aryl, and aralkyl, which are optionally substituted with one or more halogen atoms.

16. A composition according to claim 1, wherein component (A) has a viscosity of about 25 to 1,000,000 centistokes at 25° C.

17. A composition according to claim 1, wherein in component (A) the molar ratio of hydrosilyl groups in the polymer to alkenyl groups in the perfluoro compound are in the range of 0.1/1 to 0.99/1.

18. A composition according to claim 1, wherein in component (A) the molar ratio of hydrosilyl groups in the polymer to alkenyl groups in the perfluoro compound are in the range of 0.3/1 to 0.8/1.

19. A composition according to claim 1, wherein component (C) is an organohydrogenpolysiloxane.

20. A rolled milled and cured object comprising a crosslinkable fluororubber composition according to claim 1.

* * * * *